US008171265B2

(12) United States Patent
Moudgill et al.

(10) Patent No.: US 8,171,265 B2
(45) Date of Patent: May 1, 2012

(54) ACCELERATING TRACEBACK ON A SIGNAL PROCESSOR

(75) Inventors: Mayan Moudgill, White Plains, NY (US); Sitij Agrawal, New York, NY (US)

(73) Assignee: Aspen Acquisition Corporation, San Diego, CA (US)

( * ) Notice: Subject to any disclaimer, the term of this patent is extended or adjusted under 35 U.S.C. 154(b) by 0 days.

(21) Appl. No.: 12/375,202

(22) PCT Filed: Dec. 8, 2008

(86) PCT No.: PCT/US2008/085842
§ 371 (c)(1),
(2), (4) Date: Jan. 26, 2009

(87) PCT Pub. No.: WO2009/076281
PCT Pub. Date: Jun. 18, 2009

(65) Prior Publication Data
US 2010/0274989 A1    Oct. 28, 2010

Related U.S. Application Data

(60) Provisional application No. 61/012,556, filed on Dec. 10, 2007.

(51) Int. Cl.
*G06F 15/00* (2006.01)
*G06F 9/34* (2006.01)
(52) U.S. Cl. ...................... 712/220; 712/208
(58) Field of Classification Search ............ None
See application file for complete search history.

(56) References Cited

U.S. PATENT DOCUMENTS

| | | | | |
|---|---|---|---|---|
| 5,220,570 A * | 6/1993 | Lou et al. | ................ | 714/791 |
| 5,815,515 A * | 9/1998 | Dabiri | ............ | 714/795 |
| 5,832,288 A * | 11/1998 | Wong | ............... | 712/5 |
| 6,006,315 A * | 12/1999 | Park | .................. | 712/7 |
| 7,299,342 B2 | 11/2007 | Nilsson et al. | | |
| 7,506,239 B2 * | 3/2009 | Sudhakar et al. | ........... | 714/795 |
| 7,617,440 B2 * | 11/2009 | Wolf | ............. | 714/795 |
| 2001/0007142 A1 * | 7/2001 | Hocevar et al. | .............. | 714/795 |
| 2002/0010895 A1 * | 1/2002 | Mujtaba | .............. | 714/795 |
| 2002/0156990 A1 * | 10/2002 | Chen | ............... | 711/219 |
| 2005/0147189 A1 * | 7/2005 | Cohen | ............ | 375/340 |
| 2005/0278507 A1 * | 12/2005 | Check et al. | .............. | 712/210 |
| 2006/0256897 A1 * | 11/2006 | Wolf | ................ | 375/341 |
| 2007/0050603 A1 | 3/2007 | Vorbach et al. | | |
| 2007/0198815 A1 | 8/2007 | Liu et al. | | |
| 2007/0226453 A1 * | 9/2007 | Eichenberger et al. | ......... | 712/6 |

OTHER PUBLICATIONS

IPRP dated Jun. 15, 2010 in PCT/US09/085842.
International Search Report dated Feb. 13, 2009 for International Patent Application No. PCT/US2008/085842.

* cited by examiner

*Primary Examiner* — Eric Coleman
(74) *Attorney, Agent, or Firm* — Knobbe Martens Olson & Bear LLP (57) ABSTRACT

A method executed by an instruction set on a processor is described. The method includes providing a tbbit instruction, inputting a first index for the tbbit instruction, loading a second value for the tbbit instruction, wherein the second value comprises at least $2^b$ bits, using selected b bits of the first index to select at least one target bit in the loaded second value, shifting the target bit into the bottom of the first index, and computing a second index based on the shifting of the target bit into the bottom of the first index. Other methods and variations are also described.

40 Claims, 5 Drawing Sheets

ACCELERATING TRACEBACK ON A SIGNAL PROCESSOR

CROSS-REFERENCE TO RELATED APPLICATIONS

This is a National Stage patent application claiming priority to and relying for priority on PCT Patent Application No. PCT/US2008/85842, filed on Dec. 8, 2008, and U.S. Provisional Patent Application No. 61/012,556, filed on Dec. 10, 2007, the subject matter of both applications being incorporated herein by reference.

FIELD OF THE INVENTION

The invention relates to an accelerating traceback on a Single Instruction, Multiple Data ("SIMD") Digital Signal Processor ("DSP"). Specifically, the present invention concerns instruction techniques that may be employed to accelerate the execution of a viterbi decoding algorithm.

DESCRIPTION OF RELATED ART

A popular algorithm for decoding a bitstream that has been encoded using a convolutional code is the viterbi algorithm. The viterbi algorithm has two phases: a forward phase and a backward phase.

Reference is made to an m-bit message encoded using a convolutional code with constraint length k. When decoding a message encoded in this fashion, the forward pass of the viterbi algorithm creates a m+1 element array, each of whose elements is a $2^{k-1}$ bit-vector.

During the traceback phase, a m bit result is created by starting at a known index in the last element of the array, and then repeating the following steps: (1) read bit at current index and at current array element; (2) shift bit in, thereby forming the next index; and (3) decrement the element.

The straight-forward implementation in pseudo-C code for this process may be written as indicated below by Code Segment 1:

Code Segment 1

```
for(i=m;i>0;i--) {
    bit = GET_BIT(tb[i], index);
    index = ((index<<1)|bit)%2^{k-1};
}
```

As should be appreciated by those skilled in the art, when Code Segment 1 is executed, an output is produced that has m bit values.

Traditionally, the forward pass of the viterbi algorithm has dominated the amount of processing required to execute the viterbi algorithm, making the time required for the traceback a minor part of the overall computation. However, on a processor where forward pass is greatly accelerated, the traceback time becomes a significant proportion of the overall viterbi algorithm.

The amount of time required for the traceback processing, therefore, presents at least one opportunity to improve upon the prior art, among others.

The prior art with respect to the viterbi algorithm fails to present processing schema that reduce or help to reduce traceback processing time. This has resulted in a need with respect to the viterbi algorithm that the present invention seeks to address.

SUMMARY OF THE INVENTION

Accordingly, the invention addresses certain processing limitations inherent in the conventional viterbi traceback algorithm.

Generally, the invention, is applicable in a situation, such as viterbi execution on a SIMD or vector processor, where the parallelizable forward pass of the viterbi algorithm is accelerated sufficiently that the traceback path then dominates the processing time.

In other words, one aspect of the invention is to shorten the processing time of the backward traceback pass of the viterbi algorithm.

Another aspect of the invention provides for acceleration of the viterbi traceback process for a processor with a 2 read port General Purpose Register ("GPR") and a load-use latency greater than 1.

In one embodiment of the invention, a tbaddr instruction may be used to implement traceback for convolutional codes with arbitrary k.

In another embodiment of the invention, a tbbit instruction may be used to implement traceback for convolutional codes with arbitrary k.

In still another embodiment of the invention, a load-with-update instruction may be employed.

In yet another embodiment of the invention in which an integer instruction may be issued in parallel with a control and a load/store instruction, the inner-loop may be executed in 2 cycles.

Further aspects and features of the invention will be made apparent from the description that follows and the drawings appended hereto.

BRIEF DESCRIPTION OF THE DRAWINGS

The invention will now be described in connection with the drawings, in which.

DESCRIPTION OF EMBODIMENT(S) OF THE INVENTION

As noted above, one of the features of the invention includes reducing the amount of time required to execute the viterbi algorithm, specifically the traceback phase of the viterbi algorithm. The invention provides several alternatives to realize this feature.

Specifically, the invention presents several instructions to minimize processing time for the viterbi algorithm. While there are several variants of the viterbi algorithm, the hard-output variant is of particular interest for this invention. It is noted, however, that the invention may be employed in a wide variety of processing environments and should not be understood to be limited solely to the environments described herein.

Bit-Extraction

As should be understood by those skilled in the art, when a bit is read by a processor in most applications, a two-step process is employed: (1) a byte, half-word, or word is read, and (2) the bit is extracted. For example, when a processor reads a bit at index 17, the process unfolds as follows. First, the byte 2 is read. Second, the bit 1 in that byte is read. In the context of this discussion, it is noted that all bits/bytes/arrays are numbered starting at 0.

In the invention, a tbbit instruction is provided. The tbbit instruction is designed to work in conjunction with a loaded second value, which comprises at least $2^b$ bits. It is contemplated that the loaded second value will comprise $2^b$ bits, but exactly $2^b$ bits is not required to practice the invention. The tbbit instruction receives, as inputs, an index and a loaded second value. Once loaded, the tbbit instruction performs two functions: (1) it uses selected b bits (which may include the last b bits) of the index to select a target bit in the loaded second value, and (2) it shifts the target bit into a predetermined location of the index to compute the new index. The predetermined location is contemplated to be the bottom of the index. However, any other suitable portion of the index may be employed for this operation. In accordance with this, if the processor chooses to work with words or bytes, the processor may use the lowest b bits of the index to extract the target bits. The lowest b bits may be 3, 4, 5, or more bits depending upon the size of the second value of $2^b$ bits. As should be apparent to those skilled in the art, however, the lowest b bits need not be employed. It is contemplated that other bits or groups of bits may be employed without departing from the scope of the invention.

With respect to a specific embodiment of the invention, a tbbit instruction is provided. The tbbit instruction is designed to work in conjunction with a loaded half-word (2 byte). The tbbit instruction receives, as inputs, an index and a loaded half-word. Once loaded, the tbbit instruction performs two functions: (1) it uses the last 4 bits of the index to select a target bit in the loaded half-word, and (2) it shifts the target bit into the bottom of the index to compute the new index. As should be apparent to those skilled in the art, if the processor chooses to work with words or bytes, the processor may use the lowest 5 or 3 bits of the index to extract the target bits.

Address Generation

In another embodiment of the invention, a second address instruction, tbaddr, generates the address for the next byte/half-word/word to be loaded. To compute the address, the instruction: (1) finds the base of the next bit-vector, either by computing tb[i] directly, or by some other method, and (2) adds the byte offset of the byte/half-word/word containing the bit.

As should be appreciated by those skilled in the art, computing this address using a direct method to find the base requires four inputs: (1) tb, (2) i, (3) index, and (4) k. As also should be realized by those skilled in the art, four inputs exceeds the number of inputs that may be encoded in an instruction set without using special purpose registers.

The invention avoids this difficulty by basing the address computation on the current address. When the address computation is based on the current address, the process proceeds according to the following: (1) subtract the old index-offset from the old address to produce tb[i+1]; (2) subtract $2^{k-b}$ from this value to give tb[i]; and (3) add the byte offset based on the current index.

As should be apparent, the old index is made up of the bits of the current index right-shifted by 1. When right-shifted, only 3 inputs are needed for the process: (1) the old address, (2) the current index, and (3) k.

This can be further simplified. If tb is aligned so that its elements are on a $2^{k-b}$ byte boundary (i.e., the last k-b bits of address of tb[i] is always 0), then subtracting and adding the index simply becomes a matter of replacing the last k-b bits of the address with the k-b bit byte-offset.

In one embodiment of the invention, this function is split such that the subtract of the $2^{k-b}$ becomes part of the load operation. The tbaddr operation takes the old address, the current index, and k as inputs, and replaces the last k-b bits of the old-address with the byte offset based on current index. Since the invention is based, at least in part, on half-word loads, the address is half-word aligned, with lowest bit being 0. The other bits are filled with bits k-1 . . . k-b of the current index.

In this embodiment, b may be any value. In several contemplated examples, b is 3, 4, 5, or more, depending upon the particular processing scheme to be employed.

Pipelining

At first glance, the decode process appears to be inherently serial, incorporating the following process steps: (1) load the bits, (2) compute new index with the tbbit instruction, using the loaded bits and the old index, and (3) obtain the new address for load with the tbaddr instruction, using the new index and the old address.

However, for one specific embodiment, it is noted that, to compute the address, bits k-1 to 3 (for byte load) of the new address are needed. But this is the same as bits k-2 to 2 of the old address. When this analysis is extended further, it is noted that bits k-1 to 3 of step i are the same as bits k-2 to 2 of step i-1, which are the same as bits k-3 to 1 of step i-2, which are the same as bits k-4 to 0 of step i-3. Thus, it is possible to compute the address of the load up to 2 steps earlier for a byte load. For half-word and word loads, this can be computed 3 and 4 steps earlier, respectively.

With respect to the invention, the tbaddr has been modified so that the instruction set uses bits k-2 to 2. As a result, with respect to the invention, the sequence of operations is as follows: (1) obtain the new address for load with the tbaddr instruction, using the old index and the old address, and (2) load the bits in parallel with computing the new index with the tbbit instruction, using the loaded bits and the old index.

State

The objective of the trace-back is the m-bits of state. This bit-sequence is the same as the bits computed by the tbbit instruction. Thus, the index contains some subset of the bits of the state.

The invention uses a 32 bit register to hold the value of the index. Thus, it is possible to run 32 iterations of the inner loop and accumulate 32 bits of the state, which can then be stored into memory in a single word store operation.

Interleaved Elements

During the forward pass, the traceback bits are computed using a so-called viterbi butterfly. The viterbi butterfly produces the weights for index 2*i+0 and 2*i+1, and produces the weights and the traceback bits for index i+0 and i+$2^{k-2}$. If multiple adjacent butterflies are processed in parallel, then two groups of traceback bits will be produced: one in the lower half and one in the upper half of the trace-back vector. For example, assume that 8 butterflies are employed, each of which rely on states 16 . . . 31, and K=7. Then, the 16 traceback bits will be the values for the indices 8 . . . 15 and 40 . . . 47. It may prove to be more efficient to use a single half-word store to write the 2 bytes adjacent to each other rather than try to place them in the correct positions. If this is done, the resulting traceback vector will end up being interleaved. Thus, in the example above, the 8 bytes in memory will contain bits 0 . . . 7, 32 . . . 39, 8 . . . 15, 40 . . . 47, 16 . . . 23, 48 . . . 55, 24 . . . 31, and 56 . . . 63.

Dealing with interleaved traceback vectors is relatively straight-forward. When computing the address using tbaddr, the tbaddr instruction must rotate the high bit of the index (bit k-2) into a lower bit position prior to computing the offset. In the example above, where the interleave width is a byte, it must be rotated in at bit 3. In one embodiment of the invention, where the interleave width is 4 bytes, it must be rotated in at bit 5.

Another form of interleaving is to interleave the low/high bits. Thus, in the example above, instead of interleaved bytes, the trace-back vector will be interleaved as 0, 32, 1, 33, . . . , 31, 63. Dealing with this requires having tbaddr rotate the high bit into bit position 0 prior to computing the address to fetch. Since bit 0 is not used as part of the address computation, the tbaddr can simply select bits 4 . . . k-3. Additionally, the tbbit instruction must also rotate the high-order bit into bit position 0 prior to selecting the bit.

Figure 1:
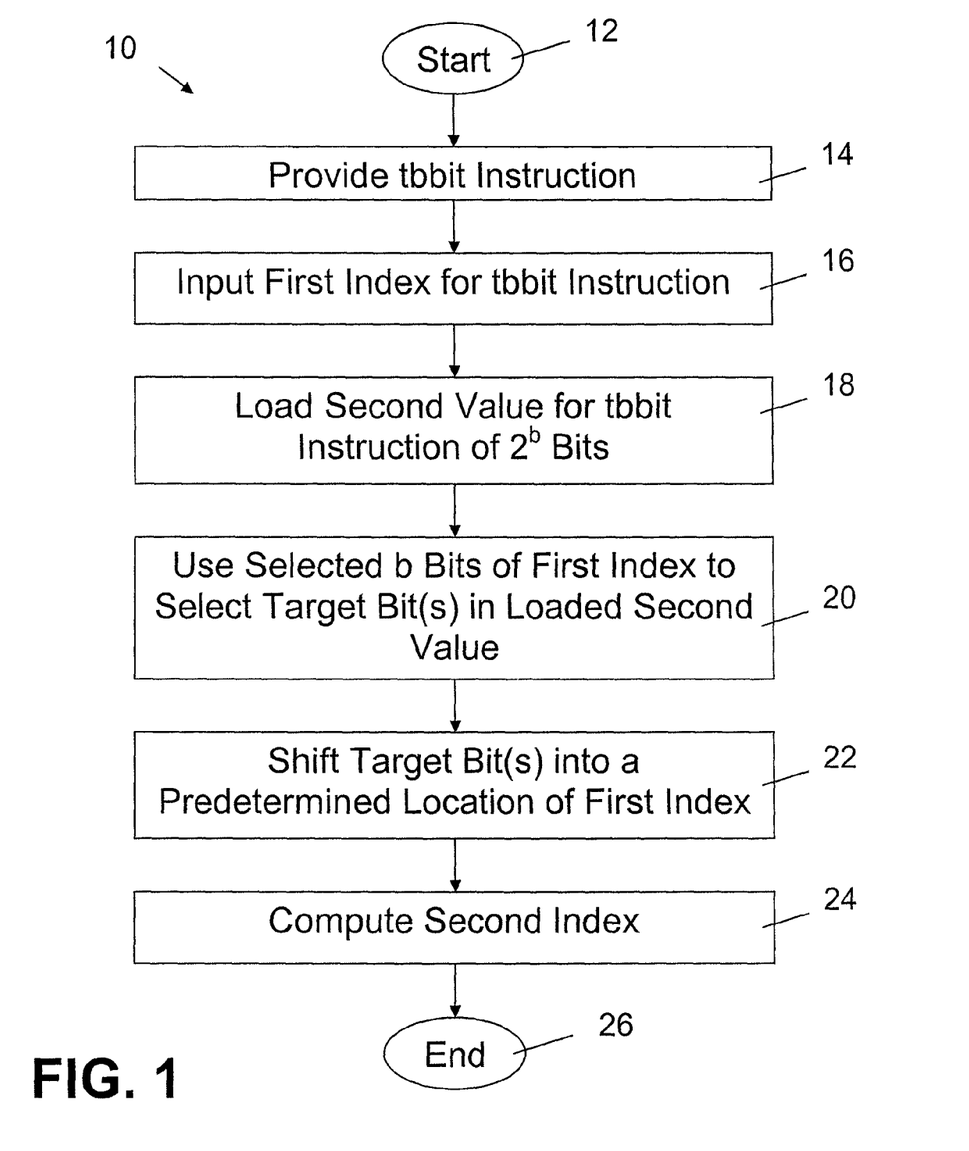
FIG. 1 is a flow diagram of the logic underlying one embodiment of the invention.
Figure 2:
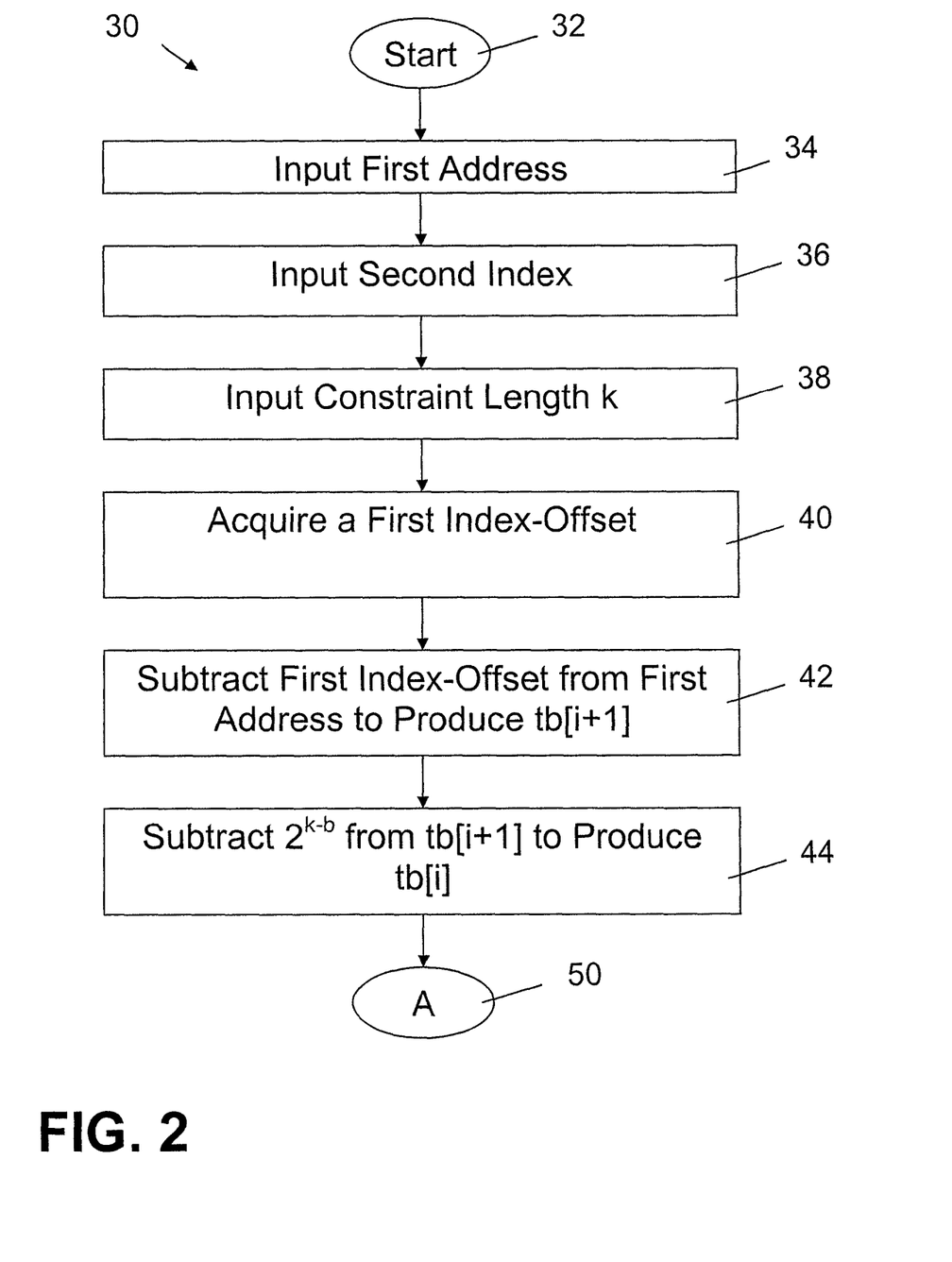
FIGS. 2 and 3 provide a flow diagram of the logic underlying another embodiment of the invention.

Reference will now be made to the drawings appended hereto. FIGS. 1 and 2 are based upon particular embodiments described herein.

As a general premise, it is noted that a traceback array is generally a 2-D byte array, where tb[N+1][$2^{k-3}$]. If it is assumed that the current trace-back bit that is processed is i+1 and the current index is c, then the address from which a load is made is A=tb+(i+1)*$2^{k-3}$+c', where c' is c[k−1:b]<<(b−3). In this example, if it is assumed that the next index (i.e., the index for i) is d, the address needed becomes B=tb+(i)*$2^{k-3}$+d'. Following this logic, to derive B from A, it is necessary to: (1) subtract $2^{k-3}$, (2) subtract c', and (3) add d'.

In one variation, the memory is organized such that the tb[i][0] address is guaranteed to have the lowest k-3 bits to be 0. In that case, A-c' is the same A when the lowest k-3 bits are cleared to 0. Further, A-c'+d' is the same as A when the lowest k-3 bits are replaced with d'.

In another variation, it is contemplated to compute A−$2^{k-3}$−c'+d' as part of the tbaddr instruction. To do this, A−$2^{k-3}$ requires a subtract operation, generally, with respect to load/store addresses.

Alternatively, it is contemplated to compute A'=A−c'+d' as part of the tbaddr instruction, and then compute A=A'−$2^{k-3}$ as part of the load instruction.

As a clarification of the traceback operation, there are at least two variants provided by the invention. In the first variation, $2^{k-b}$ is subtracted as a part of the load operation. In the second variation, the value tb[i] is computed as a part of the tbaddr instruction.

The first variation is discussed in connection with FIGS. 2 and 3. As may be appreciated from this discussion, tb[i] is derived from tb[i+1], since the values for tb are processed in reverse. The second variation is discussed in connection with FIGS. 4 and 5.

With reference to FIG. 1, a method 10 is described. The method 10 is executed by an instruction set on a processor and begins at 12. At 14, the method provides a tbbit instruction. The method 10 then proceeds to 16 where a first index is input for the tbbit instruction. At 18, a second value is loaded for the tbbit instruction, where the second value comprises at least $2^b$ bits. It is contemplated that the second value will rely on $2^b$ bits, but this exact size is not required to practice the invention. At 20, selected b bits of the first index are used to select at least one target bit in the loaded second value. The selected b bits may be the last b bits of the first index. At 22, the target bit or bits are shifted into a predetermined location in the first index. At 24, a second index is computed based on the shifting of the target bit into the predetermined location in the first index. The method 10 ends at 26.

It is noted that the predetermined location may be any predetermined location in the first index. It is contemplated that the bottom of the first index may be, in a common implementation, the predetermined location. When the at least one target bit is a plurality of bits, the bits may be shifted into the first index in a forward or in a reverse order.

In one variation, it is contemplated that the second value is $2^3$ bits, or at least $2^3$ bits, and the processor uses the lowest 3 bits of the first index to extract the at least one target bit. In another variation, the second value is $2^4$ bits, or at least $2^4$ bits, and the processor uses the lowest 4 bits of the first index to extract the at least one target bit. In still another variation, the second value is $2^5$ bits, or at least $2^5$ bits, and the processor uses the lowest 5 bits of the first index to extract the at least one target bit. As may be appreciated by those skilled in the art, the value of b may be less and 3 or greater than 5. It is expected that these are, however, the values that will be more commonly relied upon by those skilled in the art.

As should be apparent, the processor may be a SIMD processor, a DSP, or a SIMD DSP.

Figure 3:
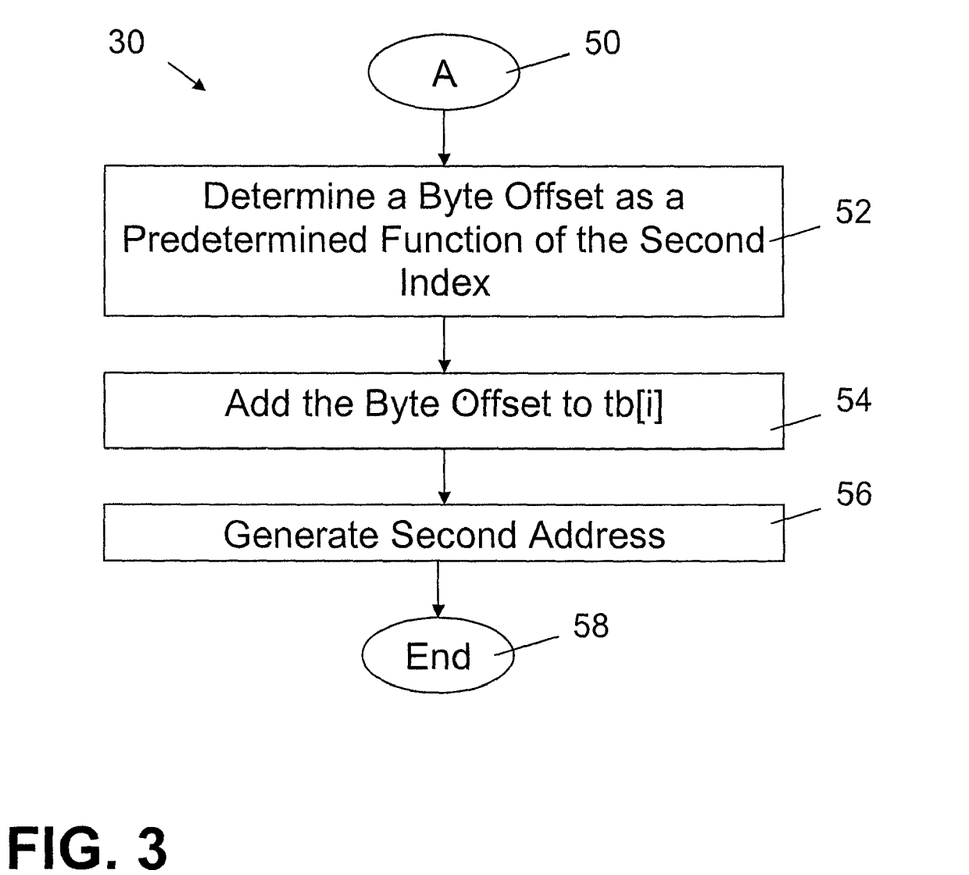

With reference to FIGS. 2 and 3, a method 30 is illustrated. This method 30 also is executed on a processor and begins at 32. At 34, a first address is inputted. At 36, a second index is inputted. At 38, a constraint length k is inputted. The constraint length k is an integer≧0. Following 38, a first index-offset is acquired at 40. Then, at 42, the first index-offset is subtracted from the first address to produce tb[i+1]. At 44, $2^{k-b}$ is subtracted from tb[i+1] to produce tb[i]. To indicate that the method continues from FIG. 2 to FIG. 3, a connector A, with reference numeral 50 is indicated in both figures. At 52, the method 30 continues. At 52, a byte offset is determined as a predetermined function of the second index. Then, at 54, the byte offset is added to tb[i]. At 56, the second address is generated. The method 30 ends at 58.

With reference to the method 30, it is noted that steps 54 and 56 may be considered to be a part of the same step. Specifically, when the byte offset is added to tb[i], this results in the generation or calculation of the second address.

In one variation of the method 30, the predetermined function of the byte offset is based on the bits of the second index right-shifted by b-3. In another variation, the predetermined function of the byte offset is based on bits k-1 to k-b of the second index. In still one further variation, the predetermined function of the byte offset is the bits k-1 to k-b of the second index. In this method, the execution of subtracting $2^{k-b}$ from tb[i+1] to produce tb[i] may be incorporated into a load operation. As noted above, the method 30 may be executed in a SIMD processor, a DSP, and/or a SIMD DSP.

It is contemplated that the method 30 may be varied from the organization presented in FIGS. 2 and 3. Specifically, it is contemplated that the method may include substituting the subtracting and adding steps with replacing the last k-b bits of the address with the k-b bit byte-offset. In this instance, tb is aligned so that its elements are on a $2^{k-b}$ byte boundary. In addition, the lowest k-b bits of the second address may be set to 0. As noted above, this simplifies processing.

In connection with the method 30, the value for b for the second address may be any one of a number of different values. It is contemplated that b may be 3, 4, or 5. As noted above, other values for b also are intended to be encompassed by the invention.

Figure 4:
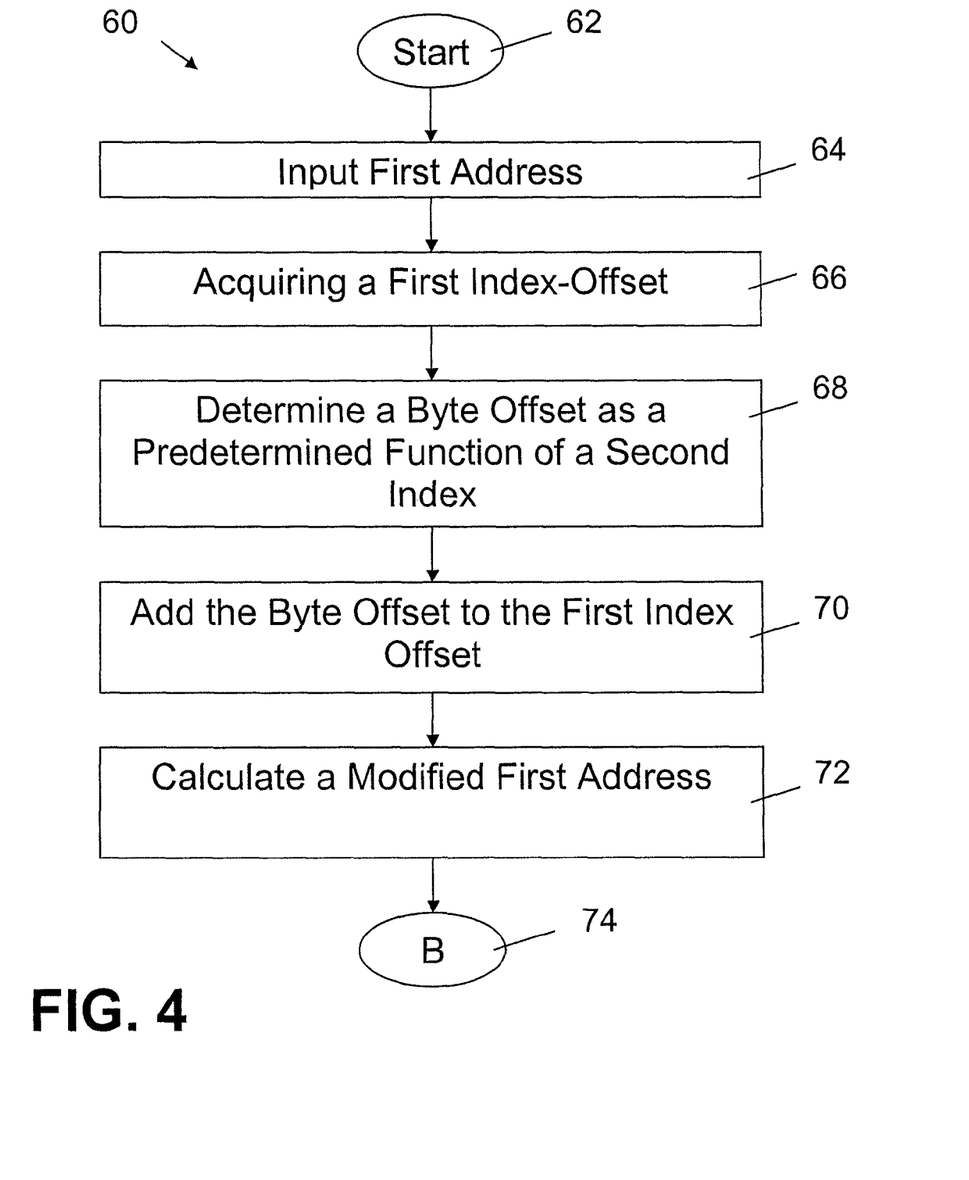
FIGS. 4 and 5 provide a flow diagram of the logic underlying one further embodiment of the invention.
Figure 5:
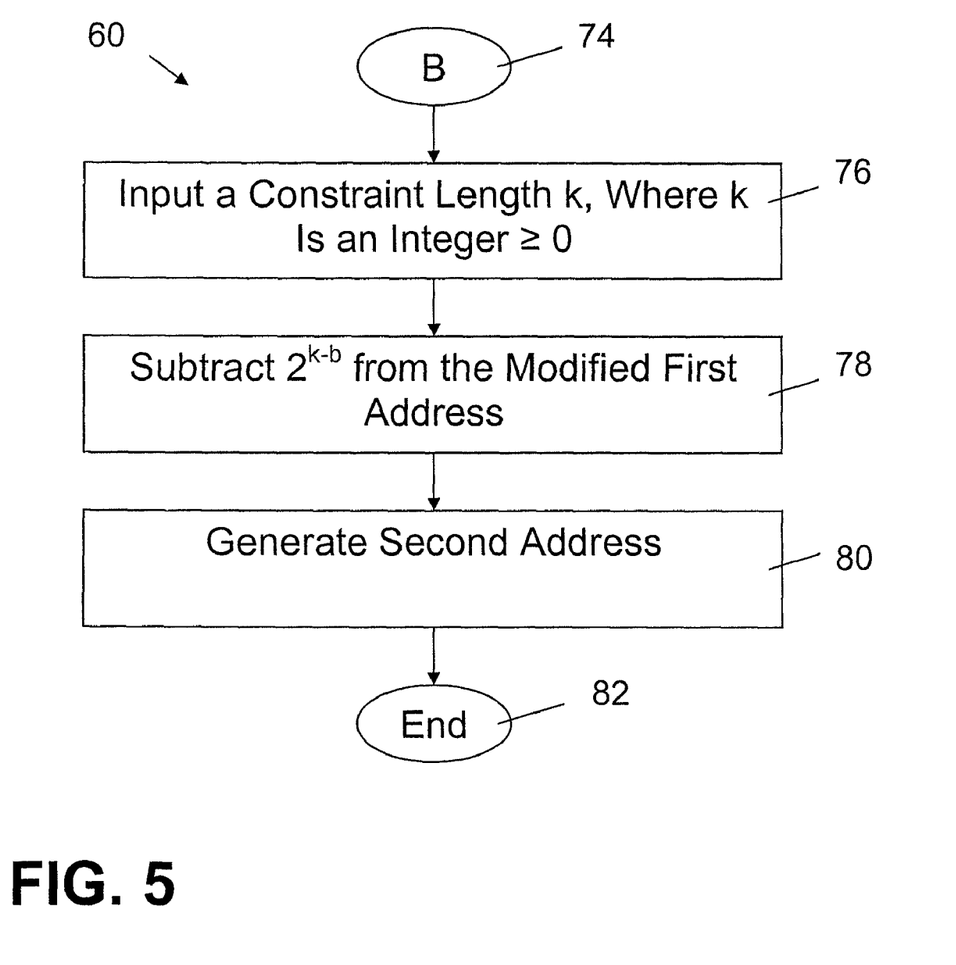

With reference to FIGS. 4 and 5, a method 60 is described that also is executed on a processor. The method 60 begins at 62. At 64, the method 60 proceeds to inputting a first address. Then, at 66, a first index-offset is acquired. From 66, the method 60 proceeds to 68 where a byte offset is determined as a predetermined function of a second index. At 70, the byte offset is added to the first index offset. Then, at 72, a modified first address is calculated. The reference 74 indicates a connector B, which transitions to FIG. 5.

With reference to FIG. 5, the method 60 continues. After the calculation of the modified first address, the method 60 proceeds to 76, where a constraint length k is inputted. As before, the constraint length k is an integer 0. At 78, $2^{k-b}$ is subtracted from the modified first address. Then, at 80, the second address is calculated. The method 60 ends at 82.

With respect to the method 60, calculating the modified first address may be a part of a tbaddr instruction. In addition, calculating the second address may be a part of a load instruction.

In one variation of the method 60, the predetermined function of the byte offset may be based on the bits of the second index right-shifted by b-3. In another variation, the predetermined function of the byte offset may be based on bits k-1 to k-b of the second index. In still another variation, the predetermined function of the byte offset may be the bits k-1 to k-b of the second index.

As may be apparent from the discussion above, the value of b may be 3, 4, or 5 for the second address. Other values are also contemplated, but these three values are perceived to be the more common variants for the invention. In addition, as discussed above, the lowest k-b bits of the second address may be set to 0. Also, the processor may be a SIMD processor, a DSP, or a SIMD DSP.

The invention also provides for a decode method that is executed on a processor that combines aspects as described above. In one contemplated embodiment, the decode method includes computing a second index by a tbbit instruction where the computation includes providing a tbbit instruction, inputting a first index for the tbbit instruction, loading a second value for the tbbit instruction, where the second value comprises at least $2^b$ bits, using selected b bits of the first index to select at least one target bit in the loaded second value, shifting the target bit into a predetermined location in the first index, and computing the second index based on the shifting of the target bit into the predetermined location. The method also includes computing a second address by a tbaddr instruction by inputting a first address, inputting a constraint length k, where k is an integer≧0, acquiring a first index-offset, subtracting the first index-offset from the first address to produce tb[i+1], subtracting 2" from tb[i+1] to produce tb[i], determining a byte offset as a predetermined function of the second index, adding the byte offset to tb[i], and generating the second address. In this method, the first index may include the bits of the second index right-shifted by 1.

In one variation of this method, the tbaddr instruction may use k-b bits to compute the byte offset. In this variation, the bits selected are k-1-L . . . b-L, where L is in a range 0 . . . b.

In another variation, the method may include additional steps of loading the bits and computing the second index with the tbbit instruction based upon the loaded bits and the first index. As may be appreciated, the loading and the computing may be performed in parallel.

In still another variation on this method, further processing steps may be employed. For example, the method may include computing the traceback bits, producing weights for the traceback bits, and producing weights at least for the first and second indices. In this context, the traceback bits and the weights may be calculated and produced via a viterbi butterfly. Alternatively, the traceback bits and the weights may be calculated and produced via a plurality of viterbi butterflies operating in parallel to one another. In still another contemplated embodiment, the plurality of viterbi butterflies may produce two groups of traceback bits, low bits in a lower half of a traceback vector and high bits in an upper half of a traceback vector. The low bits may be interleaved with respect to the high bits and the plurality of viterbi butterflies may produce interleaved traceback bits.

The invention also contemplates a further decode method that proceeds as follows. First, a second index is computed by a tbbit instruction. The tbbit instruction may include providing a tbbit instruction, inputting a first index for the tbbit instruction, loading a second value for the tbbit instruction, where the second value comprises at least $2^b$ bits, using selected b bits of the first index to select at least one target bit in the loaded second value, shifting the target bit into a predetermined location in the first index, and computing the second index based on the shifting of the target bit into the predetermined location. Then, the second address may be computed. In computing the second address, a modified first address is calculated and then the second address is calculated based on the modified first address. With respect to calculating the modified first address, the method includes, inputting a first address, acquiring a first index-offset, and adding a byte offset. To calculate the second address, the method includes inputting a constraint length k, where k is an integer 0, and subtracting $2^{k-b}$ from the modified first address. In this manner, the second address is calculated. In this method, the first index may include the bits of the second index right-shifted by 1.

So as not to be repetitive, may of the features discussed with respect to the other aspects of the invention are applicable to this method as well.

One further aspect of the invention involves pipelining. As may be appreciated from the discussion herein, pipelining involves combinations of the methods illustrated in FIGS. 1-5. For this reason, flow charts for pipelining are not provided as they would repeat the same aspects of the invention already illustrated and discussed.

As should be appreciated by those skilled in the art, the invention may be employed in a number of processing environments. The embodiments and particular processing environments described herein are not meant to be limiting of the invention in any way. To the contrary, the invention is expected to be employable in a wide variety of equivalent applications and the scope of the invention is intended to encompass such variations.

What is claimed is:

1. A method of pipelining decoding instructions in a processor, comprising:
   receiving a first instruction comprising a first index including a plurality of bits and a second value comprising at least $2^b$ target bits;
   selecting at least one target bit in the loaded second value based on the bits of the first index;
   storing the at least one target bit in a predetermined location of the first index;
   generating a second index based on the first index;
   receiving a second instruction comprising a first address, the second index, and a constraint length k, wherein k is an integer greater than or equal to zero;
   acquiring a first index-offset;
   determining a byte offset as a predetermined function of the second index; and
   generating the second address based on the first index-offset, the first address, and the second index, wherein the first index comprises the bits of the second index.

2. The method of claim 1, wherein the at least one target bit comprises a plurality of bits, which are stored in the predetermined location in the first index in a forward order.

3. The method of claim 1, wherein the at least one target bit comprises a plurality of bits, which are stored in the predetermined location in the first index in a reverse order.

4. The method of claim 1, wherein the predetermined location comprises the beginning of the first index.

5. The method of claim 1, wherein the second instruction uses k-b bits to compute the byte offset, where the bits selected are k-1-L . . . b-L, where L is in a range 0 . . . b.

6. The method of claim 5, further comprising:
loading the bits; and
computing the second index with the first instruction based upon the loaded bits and the first index.

7. The method of claim 6, wherein the loading and the computing are performed in parallel.

8. The method of claim 1, further comprising:
computing traceback bits;
producing weights for the traceback bits; and
producing weights at least for the first and second indices.

9. The method of claim 1, wherein the traceback bits and the weights are calculated and produced via a viterbi butterfly.

10. The method of claim 1, wherein the traceback bits and the weights are calculated and produced via a plurality of viterbi butterflies operating in parallel to one another.

11. The method of claim 10, wherein the plurality of viterbi butterflies produce two groups of traceback bits, low bits in a lower half of a traceback vector and high bits in an upper half of a traceback vector.

12. The method of claim 11, wherein the low bits are interleaved with respect to the high bits.

13. The method of claim 11, wherein the plurality of viterbi butterflies produce interleaved traceback bits.

14. The method of claim 1, wherein the processor is a single instruction, multiple data processor.

15. The method of claim 1, wherein the processor is a digital signal processor.

16. The method of claim 15, wherein the digital signal processor is a single instruction, multiple data digital signal processor.

17. A processor comprising:
an instruction execution circuit; and
a memory coupled with the instruction execution circuit;
wherein the instruction execution circuit is configured to:
receive a first instruction comprising a first index including a plurality of bits and a second value comprising at least $2^b$ target bits;
select at least one target bit in a second value loaded from the memory, the target bit selected based on the bits of a first index value;
store the at least one target bit in a predetermined location of the first index value;
generate a second index value based on the first index value;
receive a second instruction comprising a first address, the second index, and a constraint length k, wherein k is an integer greater than or equal to zero;
acquiring a first index-offset;
determine a byte offset as a predetermined function of the second index; and
generate the second address based on the first index-offset, the first address, and the second index, wherein the first index comprises the bits of the second index.

18. The processor of claim 17, wherein the at least one target bit comprises a plurality of bits, which are stored in the predetermined location in the first index in a forward order.

19. The processor of claim 17, wherein the predetermined location comprises the beginning of the first index.

20. The processor of claim 17, wherein the predetermined function of the byte offset is based on the bits of the second index right-shifted by b-3.

21. The processor of claim 17, wherein the predetermined function of the byte offset is based on bits k-1 to k-b of the second index.

22. A processor comprising:
means for receiving an instruction comprising a first index including a plurality of bits and a second value comprising at least $2^b$ target bits;
means for selecting at least one target bit in the loaded second value based on the bits of the first index;
means for storing the at least one target bit in a predetermined location of the first index; and
means for generating a second index based on the first index;
means for receiving a second instruction comprising a first address, the second index, and a constraint length k, wherein k is an integer greater than or equal to zero;
means for acquiring a first index-offset;
means for determining a byte offset as a predetermined function of the second index; and
means for generating the second address based on the first index-offset, the first address, and the second index, wherein the first index comprises the bits of the second index.

23. The processor of claim 22, wherein the at least one target bit comprises a plurality of bits, which are stored in the predetermined location in the first index in a forward order.

24. The processor of claim 22, wherein the predetermined location comprises the beginning of the first index.

25. The processor of claim 22, wherein the predetermined function of the byte offset is based on the bits of the second index right-shifted by b-3.

26. The processor of claim 22, wherein the predetermined function of the byte offset is based on bits k-1 to k-b of the second index.

27. The processor of claim 17, wherein the at least one target bit comprises a plurality of bits, which are stored in the predetermined location in the first index in a reverse order.

28. The processor of claim 17, wherein the second instruction uses k-b bits to compute the byte offset, where the bits selected are k-1-L . . . b-L, where L is in a range 0 . . . b.

29. The processor of claim 17, wherein the instruction execution circuit is further configured to:
load the bits; and
compute the second index with the first instruction based upon the loaded bits and the first index.

30. The processor of claim 29, wherein the loading and the computing are performed in parallel.

31. The processor of claim 17, wherein the instruction execution circuit is further configured to:
compute traceback bits;
produce weights for the traceback bits; and
produce weights at least for the first and second indices.

32. The processor of claim 17, wherein the traceback bits and the weights are calculated and produced via a viterbi butterfly.

33. The processor of claim 17, wherein the traceback bits and the weights are calculated and produced via a plurality of viterbi butterflies operating in parallel to one another.

34. The processor of claim 33, wherein the plurality of viterbi butterflies produce two groups of traceback bits, low bits in a lower half of a traceback vector and high bits in an upper half of a traceback vector.

35. The processor of claim 34, wherein the low bits are interleaved with respect to the high bits.

36. The method of claim 34, wherein the plurality of viterbi butterflies produce interleaved traceback bits.

37. The processor of claim 17, wherein the processor is a single instruction, multiple data processor.

38. The processor of claim 17, wherein the processor is a digital signal processor.

39. The processor of claim 38, wherein the digital signal processor is a single instruction, multiple data digital signal processor.

40. A non-transitory machine readable medium including instructions executable by a processor of an apparatus which cause the apparatus to:
   receive a first instruction comprising a first index including a plurality of bits and a second value comprising at least $2^b$ target bits;
   select at least one target bit in the loaded second value based on the bits of the first index;
   store the at least one target bit in a predetermined location of the first index;
   generate a second index based on the first index;
   receive a second instruction comprising a first address, the second index, and a constraint length k, wherein k is an integer greater than or equal to zero;
   acquire a first index-offset;
   determine a byte offset as a predetermined function of the second index; and
   generate the second address based on the first index-offset, the first address, and the second index, wherein the first index comprises the bits of the second index.

* * * * *